US010576900B2

(12) United States Patent
Bornais (10) Patent No.: US 10,576,900 B2
(45) Date of Patent: Mar. 3, 2020

(54) WEAPON MOUNT ASSEMBLY

(71) Applicant: Troy Sheet Metal Works, Inc., Montebello, CA (US)

(72) Inventor: Mark Bornais, Montebello, CA (US)

(73) Assignee: TROY SHEET METAL WORKS, INC., Montebello, CA (US)

( * ) Notice: Subject to any disclaimer, the term of this patent is extended or adjusted under 35 U.S.C. 154(b) by 141 days.

(21) Appl. No.: 15/625,437

(22) Filed: Jun. 16, 2017

(65) Prior Publication Data

US 2017/0361777 A1    Dec. 21, 2017

Related U.S. Application Data

(60) Provisional application No. 62/351,670, filed on Jun. 17, 2016.

(51) Int. Cl.
*B60R 7/14* (2006.01)
*F41A 23/18* (2006.01)

(52) U.S. Cl.
CPC ............... *B60R 7/14* (2013.01); *F41A 23/18* (2013.01)

(58) Field of Classification Search
CPC ............ B60R 7/14; F41A 23/26; F41A 23/18
USPC .......................................................... 211/64
See application file for complete search history.

(56) References Cited

U.S. PATENT DOCUMENTS

| 3,618,785 | A | * | 11/1971 | Newman | ................. | E05B 73/00 211/4 |
| 3,637,180 | A | * | 1/1972 | Parry | ................... | A47B 81/005 211/64 |
| 4,139,100 | A | * | 2/1979 | Reed | ....................... | F41A 17/02 211/4 |
| 4,747,280 | A | * | 5/1988 | Shaw | .................. | E05B 47/0002 211/64 |
| 4,776,471 | A | * | 10/1988 | Elkins | ..................... | A47B 57/52 211/64 |
| 4,991,723 | A | * | 2/1991 | Elkins | .................. | A47B 81/005 211/106.01 |
| 4,998,944 | A | * | 3/1991 | Lund | ....................... | F41A 23/18 211/64 |
| 6,142,313 | A | * | 11/2000 | Young | ..................... | F41A 17/02 211/4 |
| 6,438,885 | B1 | * | 8/2002 | Murray | .................. | F41A 17/54 211/64 |
| 7,137,511 | B1 | * | 11/2006 | Crowell | .................. | F41A 23/18 211/4 |
| 2011/0168649 | A1 | * | 7/2011 | Stolz | .................... | A47B 81/005 211/4 |

(Continued)

*Primary Examiner* — Michael Safavi (74) *Attorney, Agent, or Firm* — Ivan Posey, Esq.; Leech Tishman Fuscaldo Lampl (57) ABSTRACT

A weapon mount assembly comprising a mounting structure with a mounting hole therethrough for receiving a mounting connector having a head for mounting the assembly to an object, the mounting structure having a front surface and a rear surface, the mounting hole having sufficient depth that the head of the mounting connector can be recessed relative to the front face; an elongated track on the front surface of the mounting structure; a weapon lock configured to receive barrel of a weapon and slidable along the length of the track; and fasteners for locking the weapon lock in the track over the mounting hole, wherein the track is sufficiently long that the weapon lock can be locked by the fasteners over the mounting hole to prevent access to the head of the fastener.

19 Claims, 7 Drawing Sheets

(56) References Cited

U.S. PATENT DOCUMENTS

| | | | |
|---|---|---|---|
| 2013/0269509 A1* | 10/2013 | Irwin | F41A 23/005 89/37.01 |
| 2015/0128668 A1* | 5/2015 | Meredith | F41A 23/18 70/266 |
| 2016/0238337 A1* | 8/2016 | Hull | B60R 7/14 |
| 2017/0072864 A1* | 3/2017 | Fife | B60R 7/14 |
| 2018/0110332 A1* | 4/2018 | Nye | A47B 81/005 |

* cited by examiner

WEAPON MOUNT ASSEMBLY

CROSS-REFERENCE TO RELATED APPLICATIONS

The present application is a non-provisional patent application and claims the benefit of U.S. Provisional Patent Application 62/351,670, titled "Weapon Mount Assembly" filed Jun. 17, 2016; the contents of which are incorporated in this disclosure by reference in their entirety.

BACKGROUND

Weapons when not in use require safe, secure storage to prevent unauthorized access. This is especially true for law enforcement personnel who frequently are in dynamic, uncertain circumstances, and do not need the distraction of worrying about the safekeeping of their weapons. Law enforcement vehicles or military vehicles that are outfitted with weapon mounts are frequently targets for theft. Often, the gun mounts are attached to the wall that separates the front of a law enforcement vehicle from the rear passenger area. Thus, access to the mount or the mount's attachments should not be accessible to persons in the vehicle or who have access to the vehicle.

Weapons vary by type and size; therefore, the ability to adjust the mount holding the weapon is desirable. When law enforcement officers are on duty they usually have their own choice of weapon. Thus, a weapon mount in a law enforcement vehicle is used by different officers with different weapons. Thus, the weapon mount needs be both secure and able to store a variety of weapons.

An adjustable weapon mount that can accommodate different officers sharing the same vehicle and different weapons would be desirable. For these reasons there is a need for alternative weapon mount design that improves the security of current weapon mounts and can be used with a variety of weapons.

SUMMARY

The present invention is directed to a weapon mount assembly for storing weapons and a method for using the same. When a weapon is stored in the weapon mount assembly and the weapon lock is in a fixed position along the track, the weapon lock cannot be disassembled from the mounting structure, and the mounting structure cannot be disassembled from which the object it is attached.

In particular, the present invention provides a weapon mount assembly comprising a mounting structure with a mounting hole therethrough for receiving a mounting connector having a head for mounting the assembly to an object, the mounting structure having a front face and a rear face, the mounting hole having sufficient depth that the head of the mounting connector can be recessed relative to the front face; an elongated track on the front surface of the mounting structure; a weapon lock configured to receive a barrel of a weapon and slidable along the length of the track; and fasteners for locking the weapon lock in the track over the mounting hole, wherein the track is sufficiently long enough such that the weapon lock can be locked by the fasteners over the mounting hole to prevent access to the head of the connector. When the mounting connector extends through the mounting hole and is fastened to the object, the head of the mounting connector is recessed relative to the front face of the mounting structure. When the weapon lock is in a fixed position on the track covering the mounting hole and the weapon is placed in the weapon lock, the weapon cannot be removed from the weapon lock and the weapon mount assembly cannot be removed from the object.

Alternatively, the present invention comprises a weapon mount assembly having a mounting structure with a mounting hole therethrough for receiving a mounting connector, the mounting connector having a head for mounting the assembly to an object, the mounting structure having a front surface and a rear surface, the mounting hole having sufficient depth that the head of the mounting connector can be recessed relative to the front surface; a weapon lock configured to receive a barrel of a weapon, the weapon lock having a projection to attach the weapon lock to the front surface; a receiving hole on the front surface proximate to the mounting hole for receiving the projection; and fasteners for locking the weapon lock in the receiving hole, so that the weapon lock can be locked by the fasteners over the mounting hole to prevent access to the head of the connector. When the weapon lock is in a fixed position on the front surface of the mounting structure covering the mounting hole, and the weapon is placed in the weapon lock, the weapon cannot be removed from the weapon lock and the weapon mount assembly cannot be removed from the object.

Advantageously, the weapon mount assembly of the present invention can be configured for use in a law enforcement, paramilitary, or military vehicle. Theft of weapons from law enforcement of military vehicles is always a threat. The weapon mount assembly securely stores weapons to deter theft and unauthorized access. When the assembly is attached in a vehicle, the mounting structure cannot be dissembled from the object it is attached to. For example, if the weapon mount assembly is attached to the partition that divides the driver and passenger areas, even with a screw driver, crowbar, or other flat tool the assembly cannot be removed. It is therefore desirable to provide a weapon mount assembly that is relatively difficult to force open, and if broken, defines a geometry that will not provide ready access to the contained weapon.

The size and type of weapons can vary. With the adjustable weapon mount assembly of the present invention, the user can adjust the position of the weapon lock on the assembly to hold a specific type of weapon. In law enforcement, each person may require a different sized weapon. In their vehicles it is important to have the ability to adjust the weapon mount. Additionally, in a vehicle space is at a premium, therefore it is desirable to have a weapon mount assembly that can easily be adjusted to secure a variety of different sizes and types of weapons.

In another embodiment, the weapon mount assembly can be configured to store more than one weapon. Generally, law enforcement officers store two weapons in their vehicles. Under these circumstances the weapon mount assembly is configured with additional components to accommodate more than one weapon.

In yet another embodiment, custom accessories can be attached to the weapon mount assembly. For example, extended plates can be attached to the weapon mount assembly. Extended plates can be useful when different length weapons are used interchangeably in the same mount. The plates adjust on a slide mechanism and the plates cover the slides. A slide can also be optionally attached to the weapon mount assembly that allows for slight adjustability of the weapon lock. If a weapon is configured with custom accessories the mount can also accommodate accessorized weapons.

In use, the mounting structure for the weapon mount assembly is affixed to a desired object. Although this disclosure generally describes use of the weapon lock assembly in a vehicle, it can also be mounted to any other relatively flat surface such as a structural wall, a gun safe or locker, or a piece of furniture. Generally, in a law enforcement vehicle the mounting structure of the weapon mount assembly will be attached to the partition that divides the front driver area from the rear passenger section. However, the mounting structure of the weapon mount assembly can also be affixed to another area of the vehicle, such as a wall or trunk. Once the mounting structure of the weapon mount assembly is attached, the weapon lock is adjusted along the track for the correct position to store the weapon. The bracket secures the weapon lock on the track in the desired location with fasteners. The barrel of the weapon is placed in the weapon lock. Once the weapon lock is closed, the weapon is safely stored in the weapon mount assembly. If the weapon mount assembly comprises a base, the butt or stock of the weapon will be placed in the base prior to or after placing the barrel in the weapon lock. To obtain access to the weapon, the user would unlock the weapon lock and remove the barrel from the lock.

The weapon mount assembly provides an adjustable, secure, tamper-free weapon storage system.

DRAWINGS

The following drawings form part of the present specification and are included to further demonstrate certain aspects of the present invention. The invention may be better understood by reference to one or more of these drawings in combination with the detailed description of specific embodiments presented herein, where.

DESCRIPTION

Figures 1, 2:
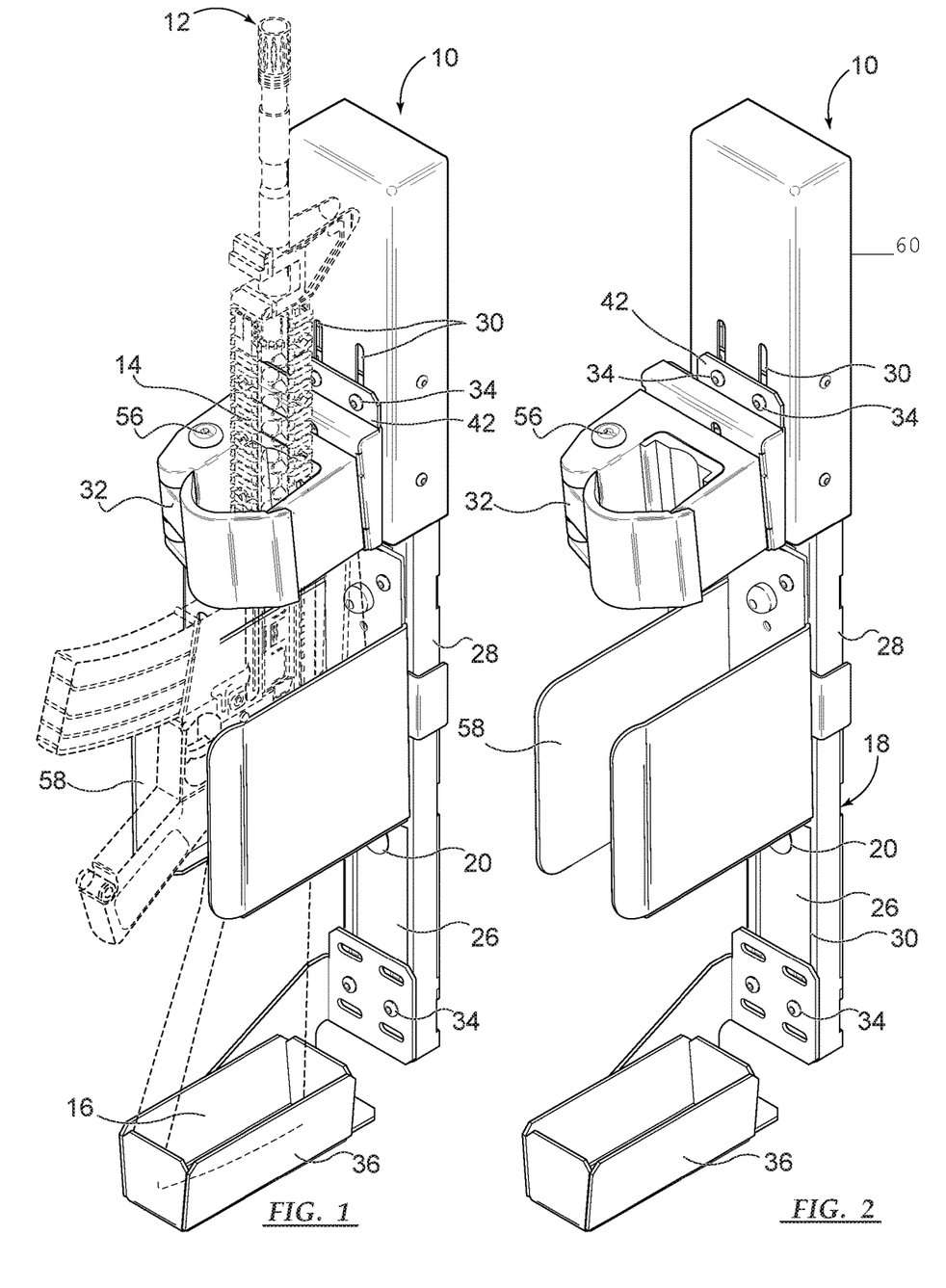
FIG. 1 is a perspective view of one embodiment of a weapon mount having features of the present invention with a weapon shown in phantom and stored therein.
FIG. 2 is a perspective view of the mount of FIG. 1 without the weapon.

As shown in FIG. 1, the invention is a weapon mount assembly 10 for storing a weapon 12 with a barrel 14 and a stock or butt 16. The weapon mount assembly 10 comprises a mounting structure 18 for mounting the weapon mount assembly 10 to an object. The mounting structure 18 has a front surface 24 and a rear surface 28. There is at least one elongated track 30 on the front surface 26 of the mounting structure 18 in a preferred configuration. A weapon lock 32 is configured to receive the barrel 14 of the weapon 12 and is slidable along the length of the track 30. Fasteners 34 can be used for locking the weapon lock 32 on the track 30 via a bracket 42. In a most preferred embodiment, the weapon mount assembly 10 has a base 36 to receive the butt 16 of the weapon 12.

FIG. 2 shows the weapon mount assembly 10 illustrated in FIG. 1 without the weapon 12.

Figure 3:
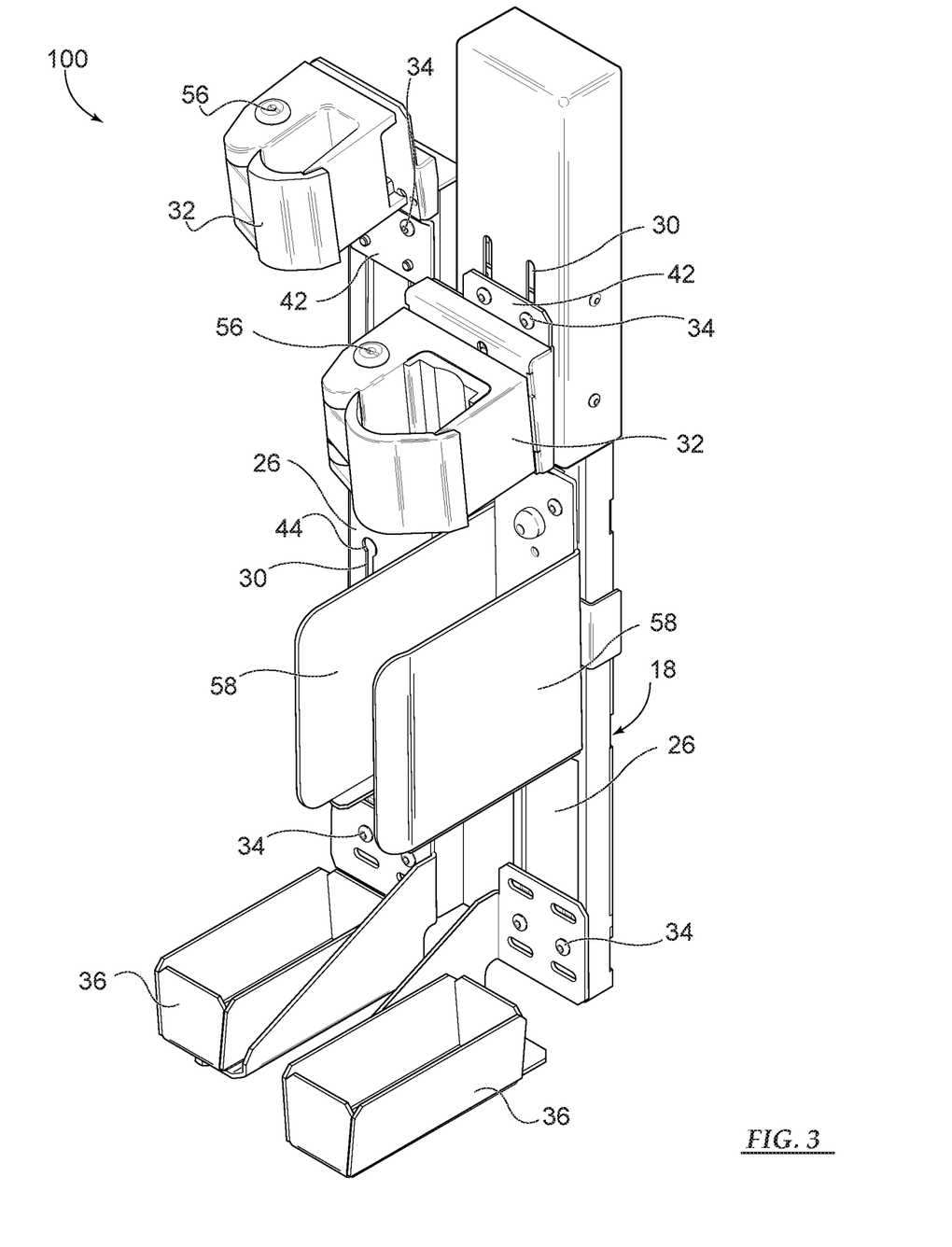
FIG. 3 is a perspective view of another embodiment of the weapon mount assembly configured to store more than one weapon.

FIG. 3 illustrates a weapon mount assembly 100 configured to safely store two weapons 12. In this configuration, there are two weapon locks 32 one for each weapon and preferably, two bases 36. Each weapon lock 32 is affixed to the mounting structure 18 to its own track 30, by the bracket 42 and fasteners 34. To accommodate multiple weapons, more than one mounting structure 18 can be mounted in the vehicle however, preferably, a single mounting structure 18 is configured to accommodate two or more weapons 12 as illustrated by the weapon mount 100 in FIG. 2.

In a preferred embodiment the mounting structure 18 is preferably an elongated element comprised of steel. In a most preferred embodiment, the steel is twelve (12) gauge cold rolled steel. The mounting structure 18 can also be made using other metals, such as zinc, aluminum or titanium, or combinations thereof. The dimensions of the mounting structure will depend on the size of the weapons being stored as well as where the weapon mount assembly 10/100 will be attached. For use in a vehicle the height of the mounting structure is between 10 and 35 inches and in a most preferred embodiment the height is between 21 and 27 inches. The width of the mounting structure 18 for a single weapon mount assembly for use in a vehicle is between 2 and 5 inches and in a most preferred embodiment approximately 3 inches. For a weapon mount assembly storing two weapons the width is between 6 and 12 inches and in a most preferred embodiment approximately 9 inches.

Figure 4:
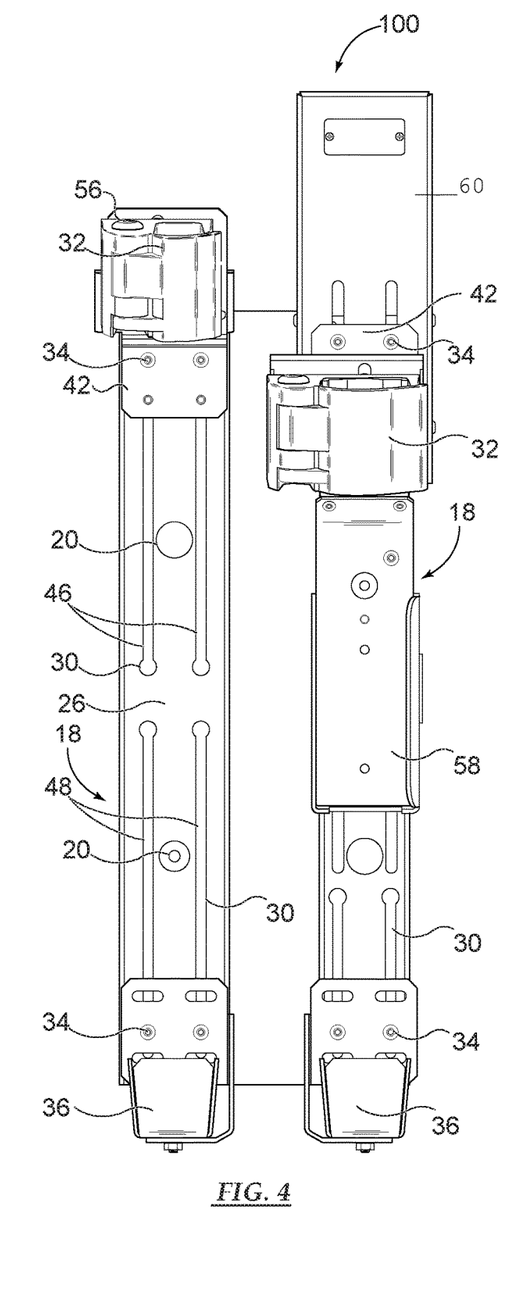
FIG. 4 is a front plan view of the weapon mount assembly of FIG. 3.
Figure 5:
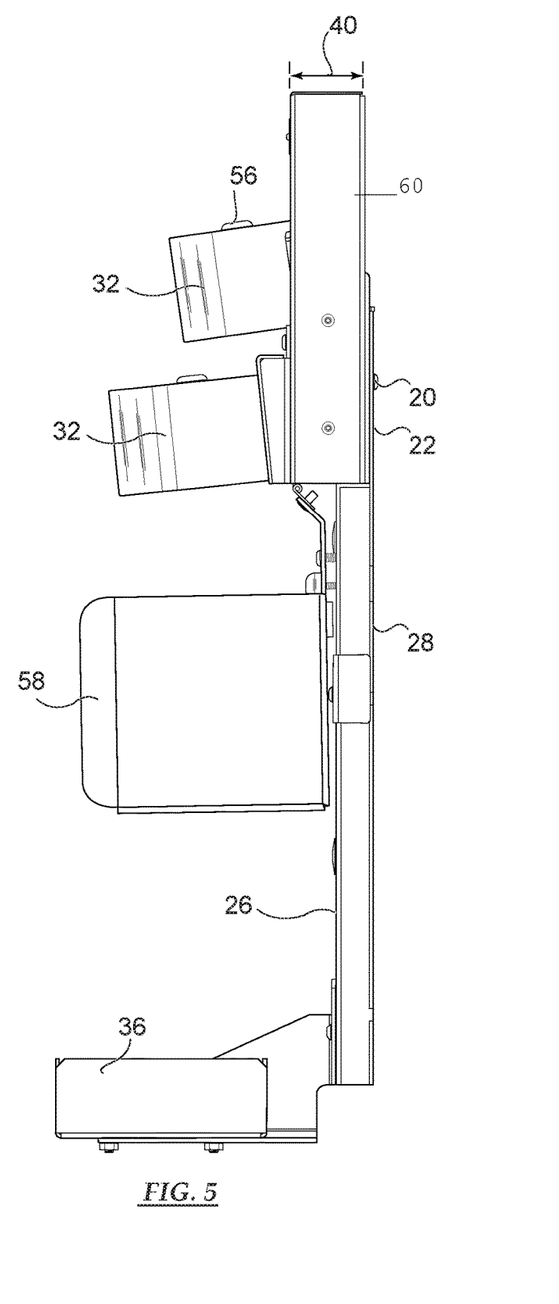
FIG. 5 is a side view of the weapon mount assembly shown in FIGS. 3 and 4.

As illustrated in FIGS. 4 and 5, the mounting structure 18 has a mounting hole 20. In a preferred embodiment, the mounting structure 18 has a predetermined distance 40 between the front surface 26 of the mounting structure 18 and the rear surface 28. In a preferred embodiment the distance between the front 26 and rear surfaces can be 0.5 inches to 5.0 inches. In a most preferred embodiment the distance 40 between front surface 26 and the rear surface is approximately 1 inch. The mounting hole 20 is cut through both the front surface 26 and the rear surface 28 creating a channel 38 best shown in FIG. 6.

Figure 6:
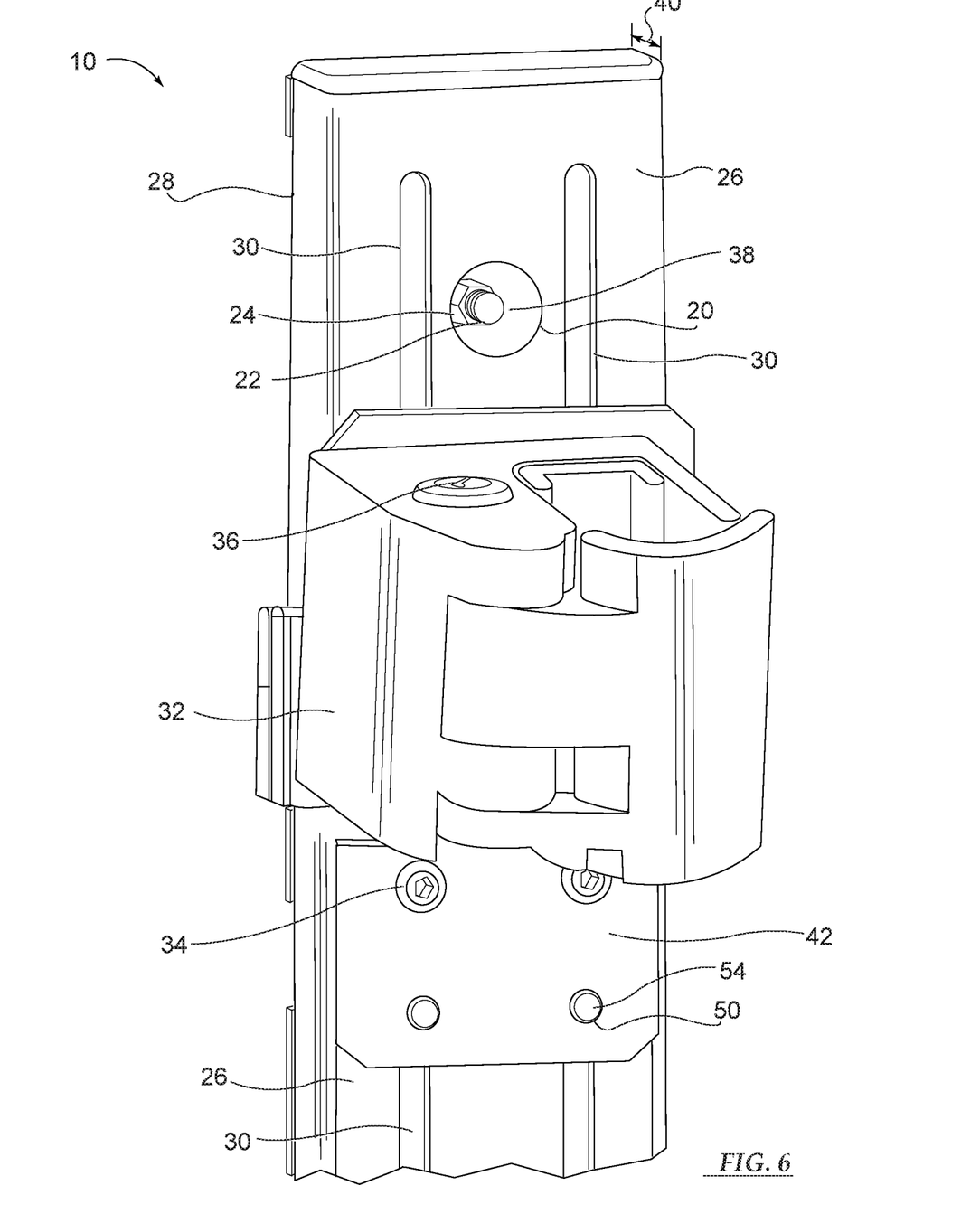
FIG. 6 is a front plan view of a portion of the weapon mount of FIGS. 2 and 3.

Now referring to FIG. 6, the mounting structure 18 has at least one mounting hole 20 therethrough for receiving a mounting connector 22 having a head 24. The mounting hole 20 must have sufficient depth such that the head 24 of the mounting connector 22 can be recessed relative to the front surface 26. The mounting hole 20 has to be recessed enough so that the weapon lock 32 can be secured over the mounting hole 20 concealing the head 24 of the mounting connector 22. In a most preferred embodiment the mounting hole is recessed at least 1/16 (one-sixteenth) of an inch. The mounting structure 18 is attached to an object by using the mounting connector 22. One example of a mounting connector 22 is a bolt 22 and the head 24 is a nut 24. When a bolt 22 is used as the mounting connector 22, the bolt 22 is inserted through the object and the rear surface of the mounting structure 18. Once inserted through the object and the rear surface 28, the end of the bolt 22 is visible inside the channel 38 from the front surface 26 of the mounting structure 18. The nut 24 is then inserted through the front surface 26 via the mounting hole 20 into the channel 38 to secure the mounting structure 18 to the desired object. For example, in a vehicle the mounting structure 18 can be secured to the partition or wall dividing the front of the vehicle from the passenger area. The mounting structure 18 can also be attached to any other relatively flat surface located in the vehicle such as, the trunk, ceiling, or door. Depending on the circumstances, in order to secure the mounting structure 18 properly, it may be necessary to have other points of attachment such as having additional mounting holes 20 on the mounting structure 18 or through the base 36.

Figure 7:
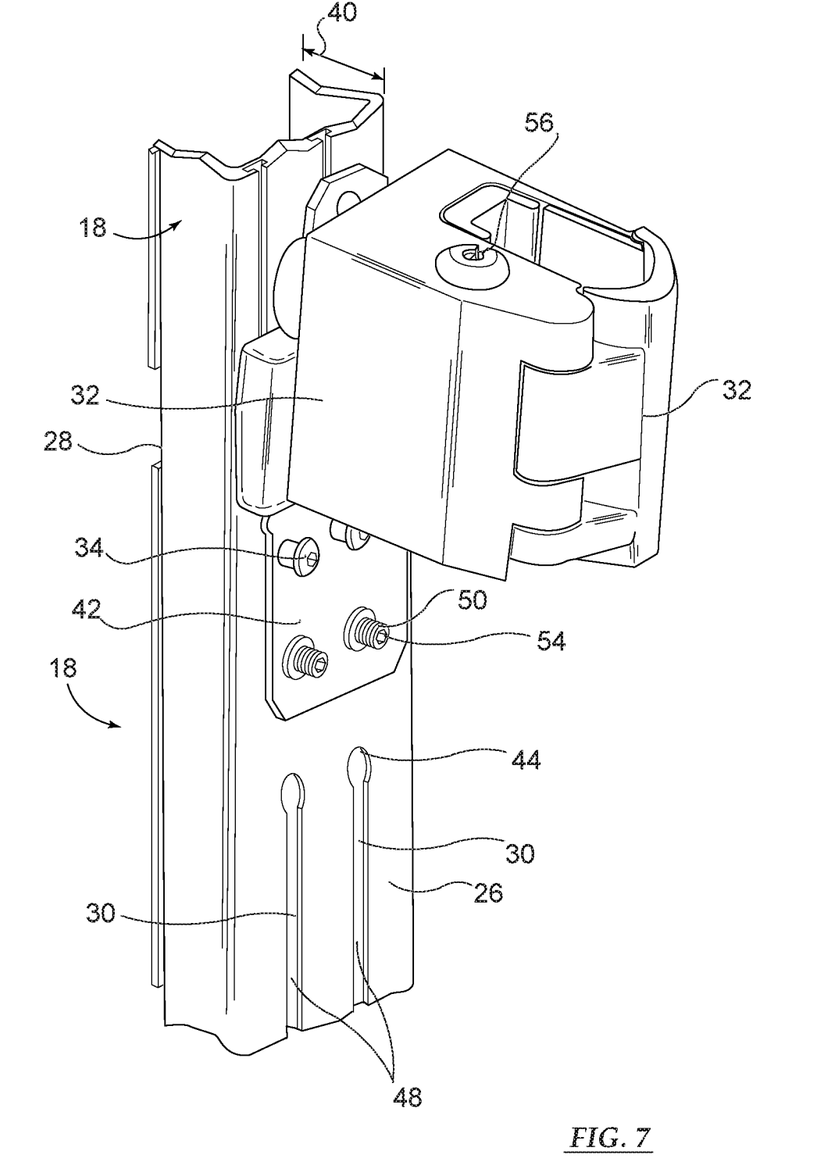
FIG. 7 is a perspective view of a portion of the weapon mount of FIG. 6.

FIG. 7 shows an elongated track 30 positioned along at least a portion of the front surface 26 of the mounting structure 18 and has a length and width. The track 30 receives a weapon lock 32. In this configuration the track 30 is sufficiently long that the weapon lock 32 can be secured by the fasteners 34 over the mounting hole 20 to prevent access to the head 24 of the mounting connector 22. While the track 30 is preferred, the mounting structure 18 can alternatively have a receiving hole. The receiving hole can be located in close proximity to the mounting hole 20 and can be in the form of a "peg" or "slot". For example, two pegs can be located on either side of the mounting hole or a slot can be positioned directly above or below the mounting hole 20. The receiving hole serves the same purpose of the track. It receives the weapon lock 32 so it can be secured with fasteners 34 concealing the mounting hole 20 preventing access to the head 24 of the mounting connector 22.

The weapon lock 32 opens and closes, as well as, locks and unlocks. It is configured to clamp the barrel 14 of the weapon 12. The weapon lock 32 is removably mounted on the track 30 and can be adjusted vertically along track 30. Each weapon 12 being stored in the weapon mount assembly 10/100 will require its own weapon lock 32. Generally, the size of the weapon lock 32 is slightly larger than the exterior dimensions of the barrel 14 or elongated portion of a weapon 12. The weapon lock 32 can be lined with an appropriate non-marring and/or cushioning material, such as felt, rubber, silicone, or the like. The weapon lock 32 can optionally include soft or hard inserts to enhance cushioning and provide anti-rattle protection. Weapon locks can be obtained from for example Santa Cruz Gun Locks, LLC and Overland Safety Systems, LLC.

The weapon lock 32 has a bracket 42 that connects the weapon lock 32 to the track 30. As an example, and best shown in FIG. 7, the track 30 has a circle with a diameter larger than the width of the track creating a "keyhole" 44. In FIG. 4, there are two pairs of tracks 30 an upper pair of tracks 46 and a lower pair of tracks 48. The upper tracks 46 have the keyhole 44 at the bottom of the tracks 30 to receive the bracket 42 of the weapon lock 32. The lower pair of tracks 30, have the keyhole 44 located at the top for the optional base 36.

Figure 8:
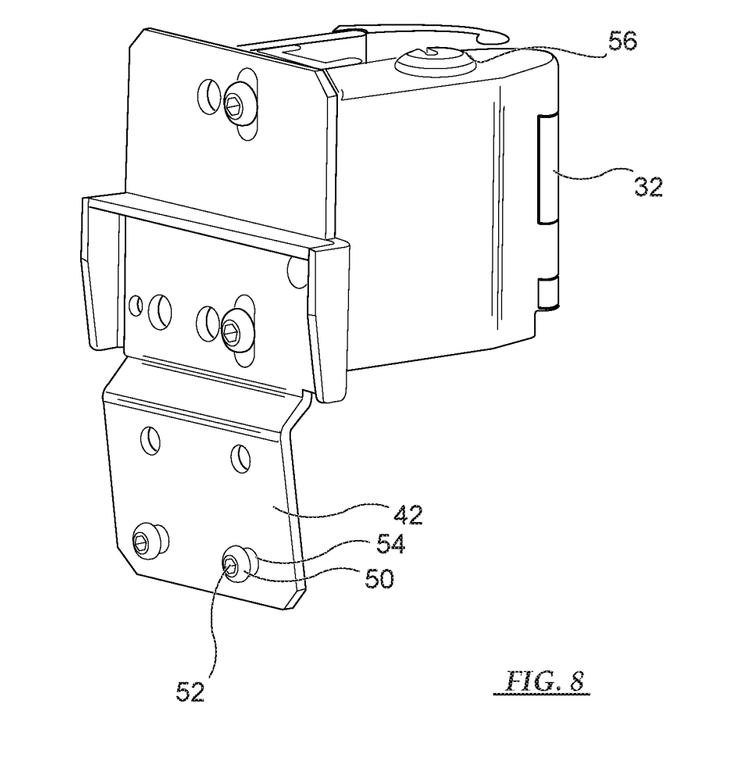
FIG. 8 is a perspective rear view of a portion of the weapon mount of FIG. 7.

As seen in FIGS. 7 and 8, a pair of projections 50 extend from the bracket 42. In this specific example, the projections 50 comprises two bolts or screws. The bolts or screws are welded to the bracket 42 and have a head 52 and a body 54. The head 52 of the projections have a diameter larger than the width of the track 30 but smaller than the diameter of the keyhole 44. The projections 50 can be inserted into the keyhole 44. When the weapon lock 32 and bracket 42 are moved away from the keyhole 44 either up or down on the track 30, the body 54 of the projections 50 moves along the track 30. The slidable weapon lock 32 and bracket 42 can be moved to different locations along the track 30. The different adjustable positions of the weapon lock 32 and bracket 42 enables the weapon assembly 10 to accommodate differently sized weapons. If the weapon lock 32 and bracket 42 are not in the keyhole 44 position on the track 30, the larger head 54 of the projection 50 prevents the weapon lock 32 and bracket 42 from being removed from the track 30. Alternatively, the bracket 42 can be made of a single molded piece of metal where a surface of the bracket 42 has a projection 50 to engage the track 30.

If the weapon mount assembly 10 is configured such that a receiving hole is used instead of a tack 30, the weapon lock 32 can be attached to the front surface 26 of the mounting structure 18 in a similar fashion using projections 50, a bracket 42, and fasteners 34.

Once the weapon lock 32 is positioned in a desired location, the bracket 42 can secure the weapon lock 32 in a fixed position on the track 30 with fasteners 34. Examples of fasteners 34 are bolts, screws and the like. Preferably, the desired location of the weapon lock 32 and/or the bracket 42 covers the mounting hole 20. When a weapon 12 is in the weapon lock 32, the weapon lock 32 cannot be moved down or up the track 30 or removed from the mounting structure 18.

The weapon lock 32 further comprises a lock-release mechanism 56 that locks and unlocks the weapon lock 32. Lock-release mechanisms 56 can range from complex electronic computer systems or as simple as a manual lock and key. For example, law enforcement vehicles have an electronic wiring station in the front console of the vehicle to control the lights, sirens, and usually to unlock the weapons in the vehicle. An electronic lock-release mechanism 56 can require wiring. Preferably, the "lock-release" wires are passed through a hole in the bracket 42 and run inside the channel 38 of the mounting structure 18. In this configuration, all wires are concealed within the channel 38 and bracket 42 preventing "hot-wiring" of the weapon lock 32.

As mentioned above, the weapon mount assembly 10 preferably comprises a base 36. Optionally, the base 20 can also be attached to the weapon mount assembly 10 in the same manner as the weapon lock 32. The base 36 can be configured with a bracket 42 having a projection 50 that can connect to the track 30 or receiving hole. Once in the desired location on the track 30 the base 36 is secured via a fastener 34. By using a bracket 42 to attach the base 36 to the weapon mount assembly 10, the base 36 cannot be disassembled from the track 30 when a weapon 12 is housed in the weapon lock 32. Alternatively, the base 36 can be configured as one welded piece with the mounting structure 18 or can be added to the mounting structure 18 using bolts, screws and the like. When a base 36 is attached to the mounting structure, in a preferred embodiment the depth of the mounting structure is 5 to 15 inches and in a most preferred embodiment 7 to 10 inches. Any plane on the base 36 can be also used to securely attach it to an object. For example, the bottom of the base 36 can also have screws to attach the base 36 to the floor of a vehicle.

Custom accessories can be attached to the weapon mount assembly 10. For example, extended plates 58 can be attached to a weapon mount assembly 10 that uses different length weapons interchangeably in the same mount 10. As illustrated in FIGS. 1 and 5, the extended plates 58 are trigger or charging bolt guards. The plates 58 adjust on a slide mechanism and the plates 58 cover the slides. Another accessory that can optionally be added to the weapon mount assembly is a slide 60. The slide 60 allows for slight adjustments of the weapon lock 32.

In use, the butt or stock 16 of the weapon 12 would be positioned in the optional base 36. The barrel 14 of the weapon 12 is placed into the weapon lock 32. The barrel 14 of the weapon can also be placed in the weapon lock 32 prior to the butt being placed in the base 36. When the weapon 12 is locked in the weapon lock 32, the weapon lock 32 cannot be removed from the weapon mount assembly 10 without authorized access. With the weapon 12 secured in the weapon lock 32, the bracket 42 and the weapon lock 32 cannot be removed from the track 30.

Figure 9:
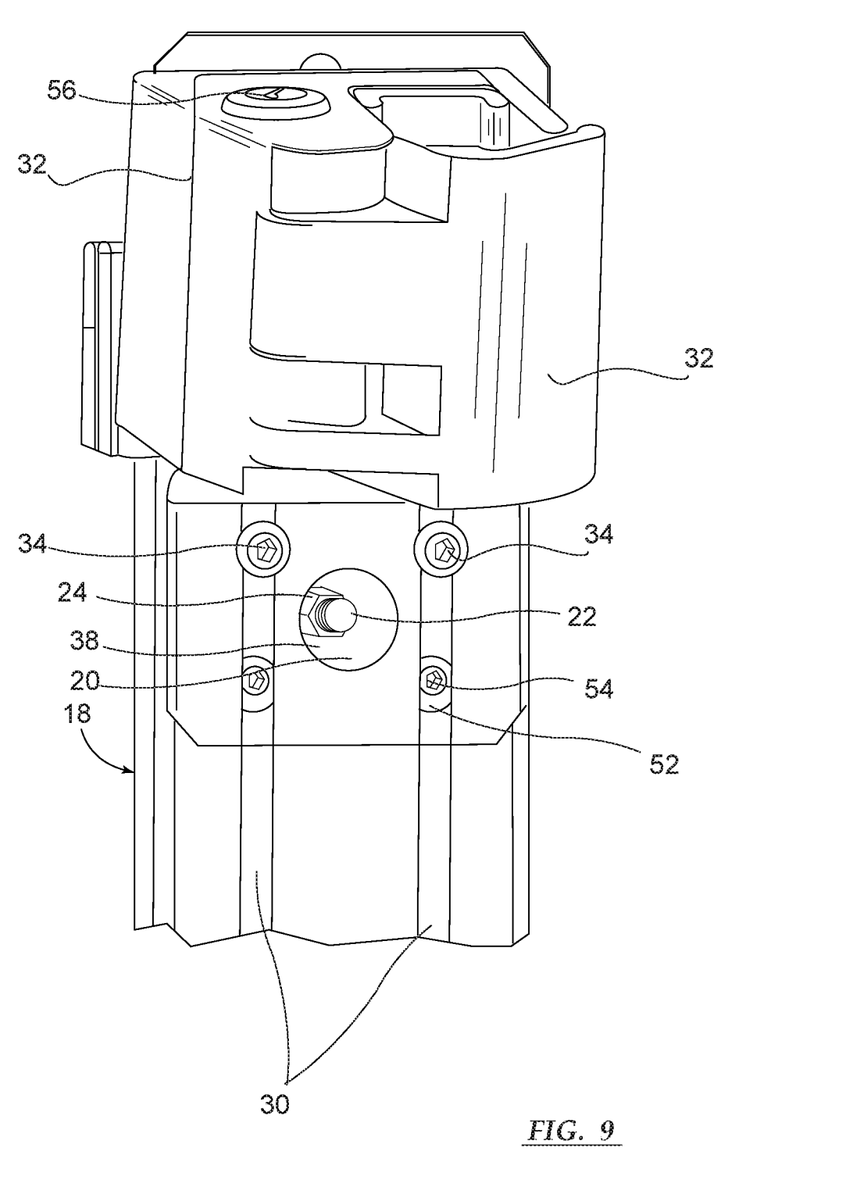
FIG. 9 is a front plan view of the portion of the weapon mount shown in FIG. 7.

As shown in FIG. 9, when the weapon lock 32 and/or bracket 42 covers the mounting hole(s) 20 in a fixed position, there is no way to access the head 24 of the mounting connector 22. In FIG. 9 the middle of the bracket 42 is exposed to show the channel 38 through the front surface 26 and mounting connector 22. One cannot disassemble the mounting structure 18 from the object it is attached to without having access to the mounting connector 22, and there is no way to remove the weapon lock 32 and bracket 42 from the weapon mount assembly 10 when a weapon is in the weapon lock 32.

Although the present invention has been discussed in considerable detail with reference to certain preferred embodiments, other embodiments are possible. Therefore, the scope of the appended claims should not be limited to the description of preferred embodiments contained in this disclosure. It should be emphasized that while the present invention is discussed principally herein in the context of a weapon mount for use in a vehicle however, the present invention is equally applicable to a variety of other uses and configurations including a wall mount, paramilitary and military vehicles or any other structure used for storing weapons. The invention can also accommodate other types of weapons including, but not limited to, swords, and bo staffs.

The invention claimed is:

1. A method of storing a weapon comprising the steps of:
   (a) attaching a mounting structure having a front surface, a rear surface and a mounting hole through the front and rear surfaces to an object by inserting a mounting connector through the mounting hole;
   (b) securing a head to the mounting connector through the front surface of the mounting structure;
   (c) placing a bracket with a weapon lock on a track located on the front surface of the mounting structure;
   (d) sliding the weapon lock and the bracket along the track until the mounting hole is no longer visible; and
   (e) securing the bracket and the weapon lock to the track with fasteners.

2. The method of claim 1 further comprising the steps of:
   (f) opening the weapon lock;
   (g) inserting a barrel of a weapon in the weapon lock; and
   (h) locking the weapon in the weapon lock.

3. The method of claim 1 wherein the object is the interior of a vehicle.

4. A weapon mount assembly comprising:
   (a) a mounting structure with a mounting hole therethrough for receiving a mounting connector having a head for mounting the assembly to an object, the mounting structure having a front surface and a rear surface, the mounting hole having sufficient depth that the head of the mounting connector can be recessed relative to the front surface;
   (b) an elongated track on the front surface of the mounting structure;
   (c) a weapon lock configured to receive a barrel of a weapon and slidable along the length of the track; and
   (d) fasteners for locking the weapon lock in the track over the mounting hole, wherein the track is sufficiently long that the weapon lock can be locked by the fasteners over the mounting hole to prevent access to the head of the connector.

5. The weapon mount assembly of claim 4 with the mounting connector extending through the mounting hole and fastened to the object with the head of the mounting connector recessed relative to the front surface of the mounting structure and the weapon lock covering the head of the mounting connector.

6. The weapon mount assembly of claim 4, further comprising a bracket for securing the weapon lock to the track.

7. The weapon mount assembly of claim 5, further comprising a release-lock mechanism for locking the weapon in the weapon lock.

8. The weapon mount assembly of claim 6, wherein the release mechanism is an electronic lock.

9. The weapon mount assembly of claim 4, wherein the front surface of the mounting structure comprises more than one track.

10. The weapon mount assembly of claim 4, wherein the track further comprises a keyhole for engaging the bracket.

11. The weapon mount assembly of claim 4, wherein the weapon lock is secured to the mounting structure with a bolt, screw or combinations thereof.

12. The weapon mount assembly of claim 4, wherein the weapon mount assembly further comprises a base for securing a butt of the weapon.

13. The weapon mount assembly of claim 4, wherein the mounting hole is recessed one-sixteenth of an inch relative to the front surface.

14. The weapon mount assembly of claim 4, wherein the mounting structure is affixed to the interior of a vehicle.

15. The weapon mount assembly of claim 4, wherein the weapon mount assembly comprises more than one weapon lock to accommodate more than one weapon.

16. A method of storing a weapon comprising the steps of:
   (a) adjusting a weapon lock having a bracket along a track, the track located on a front surface of a mounting structure, the mounting structure attached to an object by a mounting connector;
   (b) securing the bracket of the weapon lock on the track covering the mounting connector;
   (c) opening the weapon lock;
   (d) inserting a barrel of a weapon in the weapon lock; and
   (e) locking the weapon lock such that the weapon cannot be removed from the weapon lock and the mounting structure cannot be removed from the object.

17. The method of claim 16 wherein the object is the interior of a vehicle.

18. The method of claim 17 further comprising the steps of:
   (f) unlocking the weapon lock through a release-lock mechanism; and
   (g) removing the weapon from the weapon lock.

19. A weapon mount assembly comprising:
   (a) a mounting structure with a mounting hole therethrough for receiving a mounting connector having a head for mounting the assembly to an object, the mounting structure having a front surface and a rear surface, the mounting hole having sufficient depth that the head of the mounting connector can be recessed relative to the front surface;
   (b) a weapon lock configured to receive a barrel of a weapon having a projection to attach the weapon lock to the front surface;
   (c) a receiving hole on the front surface proximate to the mounting hole for receiving the projection; and
   (d) fasteners for locking the weapon lock in receiving hole over the mounting hole, so that the weapon lock can be locked by the fasteners over the mounting hole to prevent access to the head of the connector.

\* \* \* \* \*